March 28, 1961     R. J. BRITTAIN, JR     2,977,138

FLEXIBLE SEAL

Filed April 12, 1957     2 Sheets-Sheet 1

INVENTOR.
Richard J. Brittain, Jr.
BY
R. P. Barnard
ATTORNEY

March 28, 1961    R. J. BRITTAIN, JR    2,977,138
FLEXIBLE SEAL
Filed April 12, 1957    2 Sheets-Sheet 2
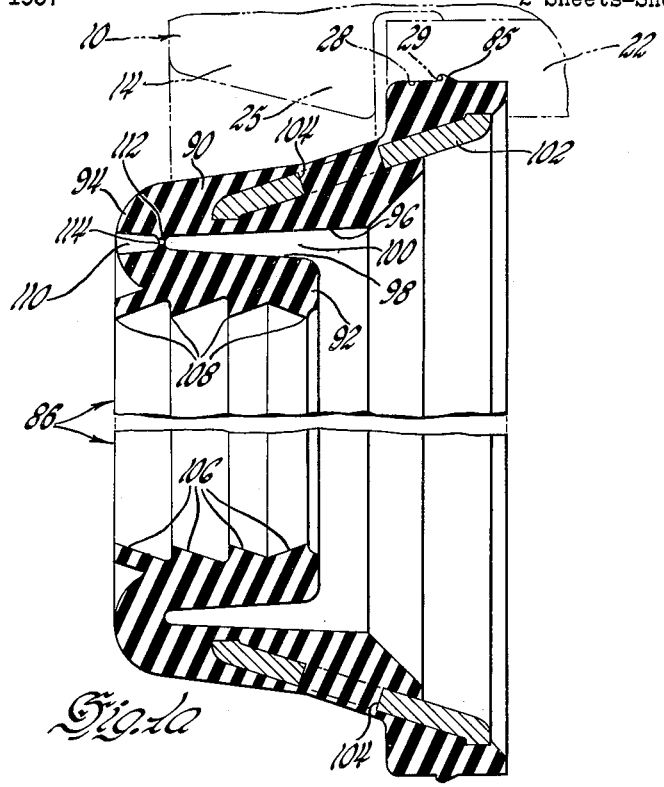
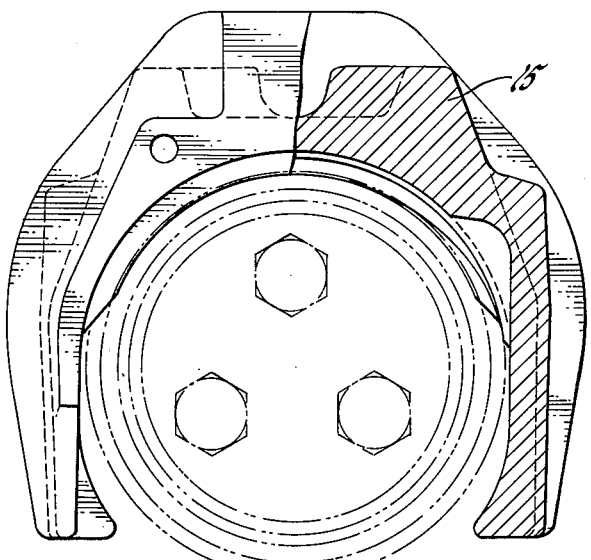
INVENTOR.
Richard J. Brittain, Jr.
BY
R. F. Barnard
ATTORNEY

United States Patent Office 2,977,138
Patented Mar. 28, 1961

2,977,138

FLEXIBLE SEAL

Richard J. Brittain, Jr., Berkeley Heights, N.J., assignor to General Motors Corporation, Detroit, Mich., a corporation of Delaware Filed Apr. 12, 1957, Ser. No. 652,487

4 Claims. (Cl. 286—11)

The present invention relates to a novel flexible seal adapted particularly for use with a lightweight railway journal box. More specifically, the invention relates to a multi-lip flexible seal adapted to normally maintain relatively light wiping pressures against the rotating member with which it coacts but which wiping pressures are automatically increased in proportion to the lubricant pressure within the journal box.

It is desirable for purposes of wear that a flexible seal maintain as light a wiping contact pressure against a rotating member as is possible. In the past it has been necessary to compromise flexible seal wear life in deference to the necessity for insuring that lubricant did not leak past the seal. This compromise has usually meant continuously operating with seal wiping pressures sufficiently high to withstand maximum lubricant pressures even though such latter pressures are reached only during a portion of the operating time of the bearing. The result of this type of operation has been undue seal wear.

It is in general the purpose of the present invention to provide a flexible seal construction in which the seal wiping pressure is variable and normally no greater than necessary to retain the lubricant within the bearing under any particular lubricant pressure condition.

It is also an object of this invention to provide a flexible seal which in addition to varying wiping pressure in accordance with lubricant pressure is also adapted to vary the seal wiping area as these pressures change.

The present flexible seal construction is adapted to vary the wiping pressure by forming an annular pocket therein exposed to and sensing the lubricant pressure within the bearing. As lubricant pressures increase within the pocket the seal may flex and be held against the rotating member with a correspondingly increased pressure. Further the seal is constructed to present a wiping or sealing surface to the rotating member which is serrated or multi-lip in nature. The multi-lip construction is such that under light lubricant pressure conditions each lip maintains substantially line contact with the rotating member but which becomes area contact as wiping pressure increases.

Thus, the present seal construction automatically adjusts its wiping pressure and area with variations in lubricant pressure to maintain the bearing against leakage in a way compatible with increased seal life.

The details of the flexible seal as well as other objects and advantages thereof will be apparent from the description which follows.

In the drawing:

Figure 1a is an enlarged view of the seal;

Figure 3 is a modified type of adaptor with which the present seal may be utilized.

Figure 1:
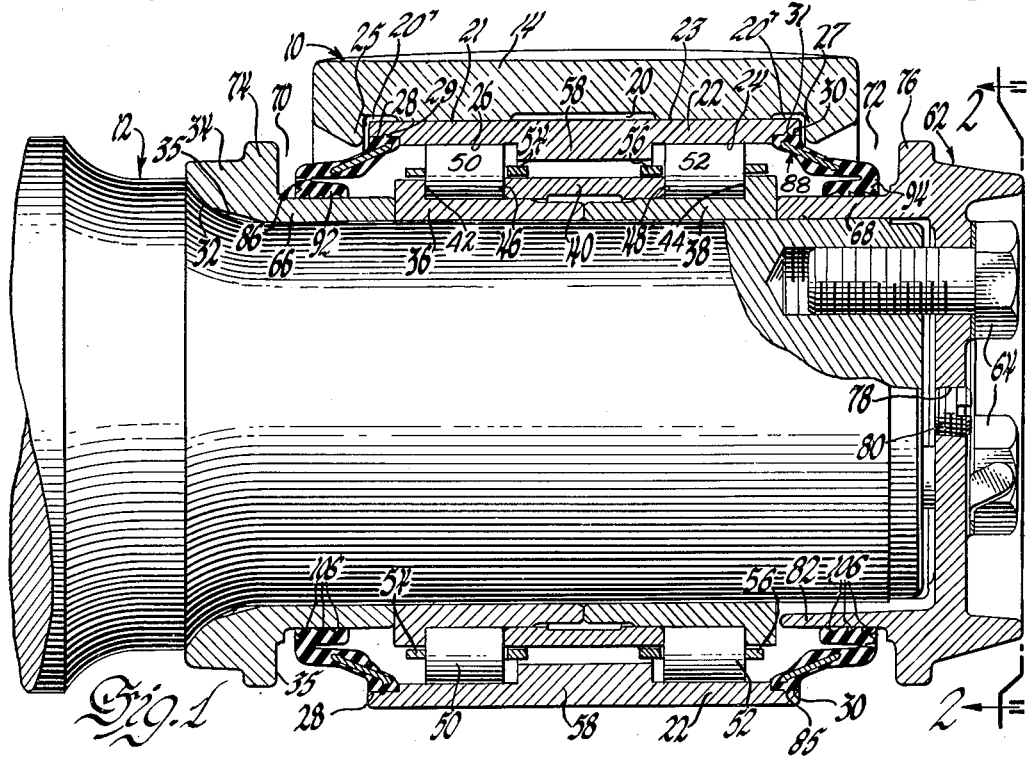
Figure 1 is a sectional view of a journal box embodying the subject flexible seal.
Figure 2:
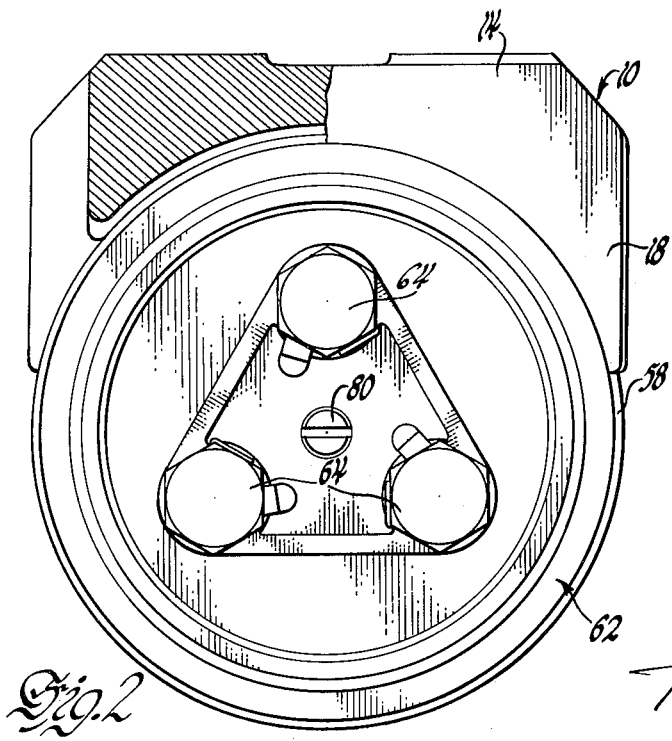
Figure 2 is a view along line 2—2 of Figure 1.

In Figure 1, a journal box is shown generally at 10 and is supported upon a rotatable axle 12. The journal box 10 includes an adaptor 14 which is adapted to support one end of the truck side frame. The truck side frame is not shown since it constitutes no part, per se, of the present invention. The adaptor 14 is of U-shaped construction with the leg portions 18 extending downwardly and partially surrounding the axle 12. Adaptor 14 includes vertically extending channels which are adapted to receive depending lugs formed on the narrow truck pedestal or integral side frame housing in such a way as to retain the latter against transverse movement relative to the adaptor 14.

An alternate design 15 of the adaptor casing for wider spread truck pedestals is shown in Figure 3. In this case relative lateral location of journal box and side frame is obtained by vertical flanges, not shown, at the top of the adaptor which position the side frame and transmit lateral thrust forces.

The inner surface of adaptor 14 is peripherally relieved to provide a transversely extending portion 20 and adjacent surfaces 21 and 23 upon which a cylindrical outer bearing member 22 is housed in subadjacent supporting relation. The outer bearing member 22 includes radially relieved portions 24 and 26 which are formed to provide bearing raceways. Member 22 is further radially relieved outboard of the bearing raceways 24 and 26 to provide seal supporting surfaces 28 and 30 which will be subsequently described.

Adaptor 14 includes radially inwardly projecting flanges 25 and 27 in close proximity with the axially inner and outer ends of outer bearing member 22 and which maintain the member in the proper axial position relative to the adaptor.

Axle 12 is formed to provide a shoulder 32 against which a dust guard ring 34 is adapted to abut. Dust guard 34 is press fitted over the axle but is radially relieved at 35 to prevent contact with the bottom of the journal fillet. A pair of inner bearing race members 36 and 38 are mounted on axle 12 in axially abutting relation. A bearing spacer 40 is mounted upon and bridges race members 36 and 38. The raceway members 36 and 38 are suitably radially relieved to provide shoulders 42 and 44 thereon and which shoulders cooperate with the radially flat faces 46 and 48 of spacer member 40 to retain the rollers of roller sets 50 and 52 in parallel axial relationship with each other and thereby prevent undue wear of the roller components as described in copending application Serial No. 576,153, Cramer, filed April 4, 1956. The individual roller elements of sets 50 and 52 are circumferentially spaced from each other by separators or cages 54 and 56. The adaptor 14 is relieved at 20 and 20' to insure that radial loading on the outer race 22 is only taken over the rollers 50 and 52.

It will be particularly noted in Figure 1 that the axial bearing set spacer 40 is wider than the corresponding portion 58 on the outer bearing member 22 and which relationship permits limited axial movement of axle 12 and the parts mounted thereon relative to the outer bearing member 22 and which relationship permits limited axial movement of axle 12 and the parts mounted thereon relative to the outer bearing member 22 and the adaptor casing 14. In this axially shifting, the axial end thrusts are alternatively transmitted, depending on the direction of shifting, through the roller bearing sets to the journal casing.

In order to removably mount the inner bearing components upon the axle 12 an outer end cap 62 is mounted upon the axle through stud members 64. Both the dust guard ring 34 and locking cap 62 include cylindrical portions 66 and 68 which extend axially within adaptor 14 and respectively abut the two inner raceways 36 and 38. Thus, as the studs 64 are threaded into axle 12 the outer end cap 62 is moved axially toward the ring 34 thereby clamping the inner bearing components 36 and 38 in position on the axle.

As best seen in Figure 1, the dust guard ring 34 and locking cap 62 are spaced from the adaptor casing 14 leaving annular openings 70 and 72 therebtween. Ring 34 and cap 62 respectively include flared portions 74 and 76 which serve as spinners, one purpose of which is to deflect dirt particles or other impurities away from the spaces 70 and 72. Flared portions 74 and 76 also protect the sealing members 86 and 88.

It should be noted at this point that a lubricant supplying opening 78 is formed in outer end cap 62 and which opening is adapted to be plugged by a cap screw 80. Lubricant, such as grease, may be introduced within the bearing cavity through opening 78. In order that the lubricant may flow within and between the roller members and the associated inner and outer raceways, the axially extending portion 68 of cap 62 is axially relieved at 82 to provide an opening through which the lubricant may pass.

Unique flexible bearing seals 86 and 88 are provided which, as will be described, seal the bearing cavity or lubricant reservoir both against the ingress of impurities and the egress of lubricant. The seals 86 and 88 are identical and therefore it will only be necessary to describe one in detail. The seals are made of any of the well known natural or synthetic materials able to withstand the deleterious effects of lubricants and the other rigors to which seals adapted for use in bearing devices are subjected. As already noted, the outer bearing member 22 is outwardly radially relieved to provide seal supporting surfaces 28 and 30 respectively having annular grooves 29 and 31 formed therein.

Referring to Figure 1a, the flexible seal 86 is of an annular configuration and includes a pair of coaxially related lips 90 and 92. The lips 90 and 92 are joined together by a portion 94 about which the lips are adapted to flex. The inner surfaces 96 and 98 of the lips taper toward the open end of the seal and define a lubricant chamber 100 therebetween.

The lip 90 has a reinforcing ring 102 embedded therein throughout the greatest part of its length. The reinforcing ring 102 has a plurality of circumferentially spaced holes 104 formed therein and into which the flexible sealing material may flow during the formation of the seal in order to secure the ring within the lip 90. The use of the reinforcing ring provides rigidity to the seal and facilitates maintaining the latter within the outer bearing member.

The radial inner surface of the inner lip 92 is of a serrated cross section. This serrated construction results in a plurality of annular wedge shaped portions 106 normally having line contact when wipingly engaging the rotatable dust guard portion 66. This line contact reduces the frictional resistance to rotation and hence the wear on the seal during normal operation. The wedge portions 106 terminate in radially inner edges 108 which are coaxial and radially equidistant from the axis of the seal with respect to each other.

As the axle 12 suddenly shifts axially relative to the adaptor 14 and the outer bearing member 22, a lubricant as grease disposed in the bearing cavity will be displaced or pumped endwise of the bearings and its pressure thereby increased due to its containment by the seal 86. Under this condition the tendency of the lubricant to be forced past the seal is also increased. To illustrate, as the axle 12 is shifted to the left, as viewed in Figure 1 the lubricant pressure in the space between the left end of the bearing set 50 and the seal 86 is increased thereby tending to pump the latter out of the bearing. However, with the seal as presently constructed the increase in lubricant pressure is translated into increasing radial pressures acting on the inner surfaces 96 and 98 of the seal lips 90 and 92. This results in an increase in the wiping pressure between the serrated edges of the inner lip 92 and the cooperating rotating surface of dust guard ring portion 66. In addition to the increase in wiping pressure, per se, the radial pressures will tend to distend or flatten the serrated wedge portions 106 increasing the seal area in wiping contact with the rotating surface and thereby further enhancing the sealing action at a time when the propensity for leaking is greatest.

The upper lip 90 includes an annular bead portion 85 which is adapted to coact with the annular groove 29 in outer bearing member 22 to retain the seal 86 in its proper axial position. It is apparent that by providing the bead and groove arrangement the seal may be snapped into engagement and held against axial displacement. The reinforcing ring 102 facilitates the retaining of the bead 85 within the annular groove 29.

In order to insure that momentary lubricant pressures do not arise which might otherwise be great enough to blow out the seal 86, means is provided for relieving excessive pressures. The pressure relieving means is adapted to bleed off lubricant when necessary to protect the seal but will not otherwise normally permit the flow of lubricant therethrough. To this end, portion 94 of seal 86 has an opening 110 molded or otherwise formed therein. Opening 110 is preferably axially aligned with the lubricant receiving opening 100 of the seal but is spaced from the latter opening by a wall portion 112 which has a small orifice 114 formed therethrough. Orifice 114 is of such a size that lubricant, due to its viscosity under normal operating conditions, will not pass therethrough. If lubricant pressures momentarily build up to a value which would otherwise be likely to blow out the seal, orifice 114 will permit a limited amount of lubricant to escape until the pressure returns to a safe value. It is apparent that any number of such orifices could be provided, however, it has been found sufficient for the noted purpose to provide one such orifice in the seal.

It will be seen that the journal box housing instead of being formed of a relatively massive casting which has heretofore completely surrounded the axle and which was combined with end caps to enclose and seal the bearing cavities, the present construction is such that a relatively light casting 14 is provided for transmitting the vehicle load to the axle and which casting in combination with the outer bearing member 22, the lightweight multi-function end caps 34 and 62 and flexible seals 86 and 88 forms a bearing housing facilitating a reduction in the size and complication of the overall journal box.

It is apparent that various structural modifications may be made in the subject seal within the intended scope of the present invention.

I claim:

1. A flexible lubricant seal comprising an annular U-shaped member having a pair of coaxially disposed divergent portions, said portions being radially spaced from each other throughout most of their lengths, said member including a portion joining a pair of adjacent ends of said coaxially disposed portions, an annular reinforcing element formed within the outer radially spaced portion, the radially inner surface of said inner radially spaced portion being serrated throughout its length, and providing a passage in the end joining portion of said member for communicating the space between said coaxial portions to the exterior of the member, said passage relieving excessive build-up of lubricant pressure against the inner side of the seal.

2. A flexible lubricant seal comprising an outer annular portion adapted to be supported within a bore, an inner sleeve portion adapted to wipingly engage a relatively movable member, a resiliently flexible neck portion connecting adjacent ends of said inner and outer portions, said inner and outer portions tapering axially and radially outwardly from their connecting portion to define a lubricant chamber therebetween, a reinforcing element embedded in said tapering outer portion, and means providing a normally closed passage through said flexible neck portion for communicating said chamber with the exterior of said seal, said passage opening under pressure of lubricant against said flexible neck portion.

3. A flexible lubricant seal as defined in claim 2 in which said passage means comprises a tapered bore generally axially aligned with the lubricant chamber, a wall separating said bore and chamber, and an orifice in said wall communicating said bore and chamber.

4. In a unitary molded seal for closing the end of an annular lubricant chamber between a housing and shaft, a resiliently deformable rim for demountable seating within the end of the housing, a radially projecting annular bead extending outwardly from the rim and arranged to fit within a housing groove, a deformable resilient frusto-conical wall secured in stepped relation to the rim at its outer end and tapering radially inwardly towards its other end, said frusto-conical wall being in radially spaced relation to said housing, a frusto-conical reinforcing ring embedded in said wall and in said rim, a reentrant inherently resilient annular sleeve portion integrally connected at its outer end to an end of the frusto-conical portion and extending axially within said frusto-conical portion, said sleeve having a peripheral wall radially spaced from said frusto-conical wall, yieldable annular sealing ribs extending radially inwardly from the sleeve for sealing engagement with said shaft, and means providing through one end of the frusto-conical wall a passage which opens sufficiently to pass lubricant therethrough in response to excessive lubricant pressure against the inner side of the seal.

References Cited in the file of this patent

UNITED STATES PATENTS

| Number | Name | Date |
|---|---|---|
| 2,386,496 | Northup | Oct. 9, 1945 |
| 2,446,380 | Meyers | Aug. 3, 1948 |
| 2,486,088 | Yaros | Oct. 25, 1949 |
| 2,597,516 | Noe | May 20, 1952 |
| 2,676,073 | Boden | Apr. 20, 1954 |
| 2,736,586 | Riesing | Feb. 28, 1956 |
| 2,783,102 | Palmgren et al. | Feb. 26, 1957 |
| 2,804,325 | Riesing | Aug. 27, 1957 |
| 2,830,858 | Moorman et al. | Apr. 15, 1958 |
| 2,834,616 | Gebert et al. | May 13, 1958 |
| 2,891,827 | Butkus | June 23, 1959 |

FOREIGN PATENTS

| Number | Country | Date |
|---|---|---|
| 715,982 | Great Britain | Sept. 22, 1954 |
| 800,550 | Germany | Nov. 13, 1950 |